(12) United States Patent
Gindi

(10) Patent No.: US 7,464,861 B2
(45) Date of Patent: Dec. 16, 2008

(54) PARTITIONED CREDIT SYSTEM

(76) Inventor: Eddie Gindi, 787 Ocean Ave., Unit 1204, Long Branch, NJ (US) 07740

( * ) Notice: Subject to any disclaimer, the term of this patent is extended or adjusted under 35 U.S.C. 154(b) by 531 days.

(21) Appl. No.: 11/045,583

(22) Filed: Jan. 28, 2005

(65) Prior Publication Data

US 2007/0203853 A1    Aug. 30, 2007

Related U.S. Application Data

(63) Continuation of application No. 09/631,309, filed on Aug. 2, 2000, now abandoned.

(51) Int. Cl.
*G06K 5/00* (2006.01)

(52) U.S. Cl. ........................ 235/380; 235/379

(58) Field of Classification Search ............... 235/380, 235/379; 705/39
See application file for complete search history.

(56) References Cited

U.S. PATENT DOCUMENTS 6,038,552 A * 3/2000 Fleischl et al. ............... 705/44
6,422,462 B1 * 7/2002 Cohen .......................... 235/381

* cited by examiner

*Primary Examiner*—Ahshik Kim
(74) *Attorney, Agent, or Firm*—Ward & Olivo

(57) ABSTRACT

The present invention discloses a wherein the total available credit for a user is divided into discrete subsets which may be attributed to different purposes such as internet purchases, business transactions, emergency spending, etc., or to different users such as children, travelers, etc.

15 Claims, No Drawings

PARTITIONED CREDIT SYSTEM

RELEATED CASES

This Application is a continuation of U.S. Patent Application Ser. No. 09/631,309, filed on Aug. 2, 2000, now abandoned.

FIELD OF THE INVENTION

The present invention relates generally to a credit protection system. More particularly, it relates to a credit protection system whereby the total available credit for a user is divided into discrete subsets which may be attributed to different purposes such as internet purchases, business transactions, emergency spending, etc.

The discrete subsets may alternatively be allocated to individual purchases rather than purchase categories. This embodiment is viewed as being particularly advantageous for purchases made by telephone or via the Internet. It is well-established that many people hesitate to make such purchases because they are reluctant to provide credit card information in an unsecured environment like the Internet.

The present invention eliminates the perceived drawbacks associated with such transactions by allowing the user to establish a sub-account for a particular purchase or other type of transaction. For example, a user wishing to make a purchase over the Internet could set up a sub-account limited to the actual cost of said purchase. Since this purchase would exhaust the credit available in the sub-account, the user has no need to fear unauthorized access to the sub-account number. Such a credit allocation system could greatly expand the public's use of and comfort with telephone and Internet purchases.

Alternatively, the sub-account could be limited to a particular vendor. For example, a child could be given a card authorized only for the college book store. In another embodiment, the present system could be utilized as a convenient alternative to traveler's checks or wiring funds. A sub-account with a pre-set dollar amount could accomplish the same goals in a simpler manner. Again, in these embodiments the possibility of credit card fraud is virtually eliminated.

BACKGROUND OF THE INVENTION

The present invention relates to the field of credit card systems and, in particular, discloses a credit security system whereby the total available credit attributed a card and its user is divided into smaller sums, each of which may be used only for specific purposes and to which the user may assign specific sub-account balances for Internet and telephone transactions.

Credit cards have been popular for many years. Users most commonly are issued a card embossed with a numerical identification as well as a magnetic strip, which they present to sellers in lieu of cash for payment. The transactions are then authorized by a remote clearing house, which allows spending up to the user's credit limit. Following authorization, the amount of the transaction is then recorded in the user's account, and a new available credit is computed as a basis of authorization for subsequent transactions. Credit providers charge both fixed annual rates, as well as interest rates on balances which they carry for their customers.

The prior art has disclosed inventions which facilitate the use of these cards and the verification of a user's credit for transaction authorization. One system which facilitates use of credit cards is shown in U.S. Pat. No. 4,700,055. This patent discloses a system which enables a user to carry a single card that may be used for multiple accounts and credit providers. The pertinent information for each account is stored on the card magnetically with a semiconductor device or by any alternative recording means.

U.S. Pat. No. 5,440,108 discloses a system which facilitates the use of credit cards in a cash card format. This cash card dispensing and revaluing system consists of a payment apparatus which receives and validates payment in conjunction with a cash card. The system also may dispense cash cards upon consumer request and payment of a predetermined amount.

A credit verification system is disclosed in U.S. Pat. No. 3,624,626. The system employs a remotely located computer and a local microprocessor communicating via telephone lines in order to retrieve information regarding validity of the credit card.

The use of credit in worldwide commerce has grown steadily over the past 30 years. Invigorating that growth has been the development and expansion of the Internet and the associated explosion of online commerce. Online wholesalers and resellers produce sales catalogs and interactive shopping tools for use by those with access to the World Wide Web. Potential purchasers may be connected to these sellers of goods and services through advertisements which may list a web address, or through a hyperlink, typically found while "surfing" the web, that directs. the appropriate web browser directly to the seller's site. Alternatively, buyers who are actively searching for a seller may employ one of the many Internet searching tools (Yahoo!, Excite, Webcrawler, etc.), which list web sites based on how nearly they match search terms provided by the user.

U.S. Pat. No. 5,727,163 discloses a method for communicating credit card data on a non-secure network. This method requires the customer who is placing an order to provide only a subset of the credit card account number to which the order is to be charged. The order is transmitted over the Internet to the purchaser's location. During a subsequent telephone call to the merchant, the customer enters the complete credit card account number, preferably on a touch tone key pad.

Another credit system developed specifically to facilitate online commerce is disclosed in U.S. Pat. No. 5,883,810. This system relies on a "card" which is issued electronically to a customer by the issuing institution. When a customer desires to make an online transaction, the customer requests a transaction number from the issuing institution for that single transaction. The transaction number is then submitted to the online seller as if it were a credit card number. When the merchant submits the transaction number for authorization, the issuing institution recognizes the number as a transaction number for an online commerce card.

While all of the patents described above provide useful methods for facilitating credit card use, the present invention provides both a unique and superior method of credit card security which will find broad application in online commerce. Credit cards provide convenient purchasing power to millions of people throughout the world; however, the method through which credit cards are used (transmission and verification of credit card numbers) makes the misuse and transaction of wrongful purchases common. If a card is lost or stolen, a person who is not authorized to use that card is able to conduct transactions until either the credit limit of the card holder is reached (which is most commonly in the thousands of dollars) or the card holder has contacted the credit providing institution and the card has been canceled.

When credit card accounts are employed in online commerce, the exposure to false transactions may be even greater.

Credit card account numbers may be misappropriated during their transmission to and from the merchant. In this case, the card holder will have no knowledge that the card number has been taken or that any fraudulent purchases were made for until his or her statement is received or a subsequent purchase has been denied due to the credit limit being reached, because the entire balance of the card holder's credit limit may be applied toward any purchase.

Despite these drawbacks, credit cards are the preferred payment method for online commerce. Sellers of goods and services online may have purchasers input their personal and credit card information into an internet browser based "Form". When the form is completed, the buyer transmits the information to the seller. There is the potential, however, for credit card account numbers to be stolen during their transmission via the Internet or from their stored location within the seller's records. This potential for the misappropriation of credit account numbers presents a significant risk of exposure to both credit card users as well as credit suppliers, who may bear the burden of false charges made with the stolen account numbers. A credit card system which provides an additional level of security to all credit card system users, and more specifically internet purchasers, is highly desirable.

The present invention decreases the exposure of credit institutions and credit card holders to unauthorized transactions. The total available credit line available for transactions is parsed into discrete units for specific types of transactions. For example, 10% of the total available credit might be designated for emergency use, while 20% might be available to online purchases, etc. Alternatively, the discrete units may be allocated to specific vendors, i.e., the local supermarket, gas station, Amazon.com, etc. Limiting the credit line and transactions in this way will hinder the illegal use of the credit account by unauthorized users. This method will facilitate the management of authorized credit card use, including use by children, and will promote responsible money management.

Alternatively, the card's discrete subsets may be allocated for particular purchases. The user will have the capability to create sub-accounts with credit limits equal to the amount of an online transaction they wish to make. When the purchase is complete, the limit of the sub-account will be exhausted and the risk of exposure to unauthorized use of the sub-account is eliminated. This embodiment will be particularly advantageous for online and telephone commerce, arenas in which many consumers are wary of credit card fraud.

Sub-accounts may also be used as a convenient alternative to traveler's checks. A card with a desired amount of credit may be obtained prior to travelling. In another embodiment, a sub-account set up for a traveller is much easier than wiring money overseas. A simple phone call to convey the sub-account number to the traveller replaces trips to particular offices (e.g., Western Union) or banks at both ends of the transaction.

SUMMARY OF THE INVENTION

The present invention relates to an improved credit card system. More specifically, the invention provides a discretely apportioned available credit line which limits transactions that can be made for particular purposes in a manner custom fit to the card holder. In an alternative embodiment, the credit card holder may create sub-accounts for specific purchases, limiting the available credit to the value of an online or telephone transaction.

This may be accomplished by the credit providing institution assembling a list of categories and potential merchants, then dividing those merchants who subscribe to its credit service within those particular categories. When a transaction is made with the credit card, authorization will be made with respect to the particular category or merchant. The credit institution may also create discrete sub-accounts for particular purchases. This system will allow that in the event the credit limit has been reached in a particular category or sub-account, either through ordinary charging or through misappropriation, the card will remain effective for emergency charges (tow trucks, hospitals, etc.) or charges for essential items like food and prescription drugs.

The current systems provide methods to facilitate credit card verification systems and to use credit card systems in different formats. None of the prior art addresses a credit card solution which apportions credit availability to specific purposes and limits false charges in each discrete billing category, while simultaneously allowing card holders control over their own transactions and the transactions of other authorized card users.

In accordance with the present invention, the partitioned credit card system combines the traditional advantages of credit cards with the advantages of a segregated credit line. For example, transactions authorized by the system for online commerce would be limited to a preset portion of the card user's total credit line. The card holder is given the freedom to shop using a credit system while knowing that the card will always be functional in an emergency or for essential purchases.

Another advantage of this partitioned credit card system is its limitation of unauthorized transactions in any particular category up to that category's limit. Those who steal card numbers either during online transmission or through theft of the card itself are limited in their attempt to defraud the cardholder by preset categories and credit limits. Each category limit will be much lower than the total credit card limit, thereby greatly reducing the exposure of card users and credit institutions to unauthorized purchases.

Even this limited exposure is eliminated for online and telephone commerce through the use of sub-accounts, which the user may establish for individual transactions. In this embodiment of the present invention, the user may create sub-accounts with credit limits equal in amount to the transaction amount. When the transaction is complete, the sub-account is empty so there can be no unauthorized purchases.

In light of the above, it is an object of the present invention to combine the benefits of a traditional credit card system with a partitioned credit line which may be grouped by category.

An additional object of this invention is to provide a credit card system whereby the user may create sub-accounts with specific credit limits for specific transactions or vendors.

Another object of this invention is to provide greater security for credit card systems by reducing the amount to which transactions in any specific category can be made and by producing an improved online commerce system.

A further object of this invention is to provide a means by which customers may set limits on their own spending in particular categories of merchants.

Yet another object of this invention is to provide a means whereby credit card holders will have a guaranteed credit line in the event of emergencies.

DETAILED DESCRIPTION OF A PREFERRED EMBODIMENT

As discussed above, the present invention relates generally to a credit protection system. More particularly, it relates to a credit protection system whereby the total available credit for a user is divided into discrete subsets which are attributed to different purposes or vendors, such as Internet purchases, business transactions, emergency spending, specific transactions etc. Preferably, this is accomplished by the designation of merchants, who are serviced by the system, to a particular category. Each category is then allotted a particular pro rata share or dollar amount of the card holder's total available credit. The card holder or any other authorized or unauthorized user will not have transactions authorized in excess of the category limit, thereby limiting the potential for false transactions which can be made with the card while also providing a self management tool for card holders and those whom they authorize to use the card.

In addition, it relates to a credit card system where the user may create sub-accounts for specific purchases. Preferably, this would be accomplished by the user contacting the credit card company (either by telephone or online) and requesting that a sub-account be created. The user would request that the sub-account have a total available credit equivalent to a particular transaction which he or she wishes to make. The credit institution would then issue the user a transaction number which would have the same form as a credit card number. The user would submit the transaction number to a merchant, and when the transaction is completed, the sub-account will be depleted. Since each transaction number will only be used for a single transaction, there will be no risk of fraud in the event that the transaction number is stolen.

In a typical application, the total available credit ("TAC") 1 to a card holder under the disclosed credit system is partitioned into any number of sub-categories. The percentage of the total available credit to each category may be custom tailored the specific needs of the card holder. For example, the available credit for emergencies would likely be a relatively small percentage of the total available credit.

It is envisioned that merchants could also be divided and sub-divided into categories. For example, emergency situations could be further partitioned into hospitals, auto repair and salvage companies. Similarly, a travel category may be further defined in sub-divisions representing air travel, hotels and car rentals. Online communication could incorporate ISPs, merchants and service providers. Clothing might include department stores, mail order catalogs and specialty clothing. A generic food category could include restaurants, supermarkets and convenience stores. A miscellaneous category is likewise suggested, accounting for all non-specific transactions.

In one embodiment, a Credit Account Provider furnishes an Electronic Exchange Station, which is contacted by the Credit Account User. The Electronic Exchange Station recognizes the Credit Account User, who, in turn, keys-in instructions to the Electronic Exchange Station. The Electronic Exchange Station accepts the Credit Account User's instructions and confirms a newly created-defined sub-credit-card number. The Credit Account User receives confirmation of the newly created-defined sub-credit-card number, and presents it to the Vendor for purchase. The Vendor accepts the number tendered by the Credit Account User and contacts the Credit Account Provider via the Electronic Exchange Station for rejection or approval of the transaction. The Electronic Exchange Station subsequently compares the number offered by the Vendor to the previously created-defined sub-credit card number. The Electronic Exchange Station will then approve the Vendor's credit-transaction approval request, or it will reject any sub-credit-card numbers that expired after one-time use, expired after a pre-instructed programmed date, expired after a pre-determined number of uses, expired after exhaustion of the pre-set credit limit, or that failed for other programmed pre-determined limitations, etc.

The foregoing techniques, systems and operating structures in accordance with the present invention may be embodied in a wide variety of forms and modes, some of which may be quite different from those in the disclosed embodiment. Consequently, the specific structural and functional details disclosed herein are merely representative. Other embodiments will be immediately apparent to those of skill in the art.

What is claimed is:

1. A method for providing a credit card system, the method comprising the steps of:
   providing a credit line to a user, the credit line having an overall credit limit amount representing the total available credit accessible to a credit card holder;
   identifying a plurality of predetermined vendor groups;
   identifying a plurality of predetermined vendors;
   associating each predetermined vendor with one or more of the vendor groups;
   providing an exchange station to a user;
   providing a plurality of sub-accounts to the user, each sub-account being created at the request of the user through the exchange station;
   assigning each of the plurality of sub-accounts a subaccount credit limit amount apportioned from the overall credit limit amount;
   associating each of the sub-accounts with one or more of the vendor groups,
   wherein a payment authorization from a vendor is debited from a sub-account associated with the vendor group with which the vendor is associated; and
   handling payment authorization for a transaction from a vendor associated with a vendor group which is associated with sub-account through the exchange station.

2. The method of claim 1 wherein one or more vendor groups are determined based on one of a plurality of predetermined types of transaction.

3. The method of claim 2 wherein one of the predetermined types of transactions is an emergency transaction type, and wherein the vendors associated with the emergency transaction type are vendors providing services associated with emergency services.

4. The method of claim 2, wherein one of the predetermined types of transactions is an Internet transaction type, and wherein the vendors associated with the Internet transaction type sell products over the Internet.

5. The method of claim 2, wherein one of the predetermined types of transactions is an telephone transaction type, and wherein the vendors associated with the telephone transaction type sell products over the Internet.

6. The method of claim 1, wherein the sub-account credit limit amount assigned to each sub-account is assigned as a percentage of the overall credit limit amount.

7. The method of claim 1, wherein the sum of the sub-account credit limits is equal to the overall credit limit.

8. A credit card system comprising:
   a credit line having an overall credit limit amount representing the total available credit to a credit card holder;
   a plurality of sub-accounts associated with the overall credit limit amount,
   wherein each of the sub-accounts has an associated sub-account credit limit amount that is apportioned as a fixed percentage of the overall credit limit amount; and
   a plurality of predetermined transaction types, each transaction type having a predetermined group of vendors associated therewith, each vendor being associated with the transaction type based on one or more properties of the vendor;

wherein the credit limit amount is apportioned to a plurality of sub-accounts, each of the plurality of sub-accounts associated with at least one transaction type; and wherein a payment authorization made by one the vendors associated with one of the transaction types is applied to the subaccount associated with the transaction type.

9. The credit card system according to claim 8, wherein one or more transaction types comprise telephone transactions, and wherein one of the properties of the vendor is that the vendor sells via telephone.

10. The credit card system according to claim 8, wherein one more transaction types comprise internet transactions, and wherein one of the properties of the vendor is that the vendor sells via the internet.

11. The credit card system according to claim 8, wherein one of the transaction types is emergency use, the emergency use transaction type associated with a sub-account to create an emergency sub-account having a credit line that is a percentage of the overall credit limit.

12. A credit card system comprising:

a credit line having an overall credit limit amount representing the total available credit to a credit card holder;

a plurality of sub-accounts available to a user and associated with the overall credit limit amount; and a plurality of vendor groups, each vendor group comprising one or more predetermined vendors;

wherein each of the sub-accounts has an associated sub-account credit limit amount that is apportioned from the overall credit limit amount;

wherein each of the vendor groups is associated with at least one sub-account; and wherein a payment authorization made by one the vendors associated with the one of the vendor groups is applied to the sub-account associated with the vendor group.

13. The credit card system according to claim 12, wherein the credit limit amount of each of the sub-accounts as a percentage of the overall credit limit amount of the credit line, and wherein the payment authorizations applied a sub-account reduces the credit limit amount of the sub-account available to a user by the amount of the payment authorization.

14. The credit card system according to claim 13, wherein the sum of the sub-account credit limit amounts is equal to the overall credit limit amount.

15. The credit card system according to claim 12, wherein the credit limit amount of each of the sub-accounts as a fixed dollar amount less than the overall credit limit amount of the credit line, and wherein the sum of the credit limits of the sub-accounts is equal to the overall credit limit, and payment authorizations applied to a sub-accounts reduces the credit limit amount available to a user.

* * * * *